US009565799B1

(12) United States Patent
Finch

(10) Patent No.: US 9,565,799 B1
(45) Date of Patent: Feb. 14, 2017

(54) PUNCTUREVINE BURR PICKER

(71) Applicant: Arden D. Finch, Mariposa, CA (US)

(72) Inventor: Arden D. Finch, Mariposa, CA (US)

( * ) Notice: Subject to any disclaimer, the term of this patent is extended or adjusted under 35 U.S.C. 154(b) by 0 days.

(21) Appl. No.: 14/983,453

(22) Filed: Dec. 29, 2015

Related U.S. Application Data

(60) Provisional application No. 62/097,523, filed on Dec. 29, 2014.

(51) Int. Cl.
*A01D 11/00* (2006.01)
*A01D 46/00* (2006.01)

(52) U.S. Cl.
CPC .............. *A01D 11/00* (2013.01); *A01D 46/00* (2013.01)

(58) Field of Classification Search
CPC ............................... A01D 46/00; A01D 11/00
USPC ...... 56/126, 127, 328.1, 16.6; 414/440, 437; 15/78, 79.1
See application file for complete search history.

(56) References Cited

U.S. PATENT DOCUMENTS

| 2,729,046 | A | * | 1/1956 | Patterson | A01D 51/002 198/506 |
| 3,989,151 | A | * | 11/1976 | Dyer | A63B 47/021 414/437 |
| 4,066,179 | A | * | 1/1978 | Livingston | A01D 51/002 414/440 |
| 5,025,620 | A | * | 6/1991 | Dudley | A01D 51/002 414/440 |
| 2015/0208588 | A1 | * | 7/2015 | Cady | A01G 1/125 15/98 |

* cited by examiner

Primary Examiner — John G Weiss
(74) Attorney, Agent, or Firm — Imperium Patent Works; T. Lester Wallace; Amir V. Adibl

(57) ABSTRACT

A device usable for picking up puncturevine burrs comprises a cylindrical roller member, a scraper, a catch, a support member, and a handle member. The cylindrical roller member has a rotational axis and has an outside surface layer made of a resilient material such that the burrs will readily stick into the material. The scraper scrapes the surface of the roller member when the roller member rotates about its rotational axis. The support member holds the scraper and catch so that the scraper scrapes over the surface of the roller member during rotation. In operation, a user pushes the device over the area of the ground with burrs. Under the weight of the device itself, the burrs are picked up by the roller member and are scraped off of the roller member by the scraper, and are retained by the catch. Burrs that collect in the catch are disposed of.

6 Claims, 6 Drawing Sheets

PUNCTUREVINE BURR PICKER

CLAIM OF PRIORITY UNDER 35 U.S.C. §119

This application claims the benefit under 35 U.S.C. §119 of U.S. Provisional Application Ser. No. 62/097,523 entitled "Puncturevine Burr Picker," filed Dec. 29, 2014, the subject matter of which is incorporated herein by reference.

TECHNICAL FIELD

The present disclosure relates to devices for picking up and removal of puncturevine burrs, and to related methods.

BACKGROUND

In California there is a very troublesome weed (*Tribulus terrestris*) that is known as "puncturevine" or "goathead". The weed is a summer annual broadleaf weed that grows laterally and low to the ground, extending out in a circular fashion from a central taproot. When the plant is allowed to grow sufficiently, it can form a large circular mat several feet in diameter. This vine forms many seedpods of thorned burrs. The thorned burrs ripen and drop off the plant. Each burr has two extremely sharp thorns. The weed is also referred to as "goathead" because an individual burr, when viewed from one perspective, has the appearance of a goat's head with two very sharp spikes extending as would horns from a central portion of the burr that looks like a goat's head. One puncturevine plant can produce thousands of such burrs. The thorns of these burrs are so sharp and strong, that they can injure people or animals who step on the burrs. An individual burr can be large enough to pierce and puncture vehicle tires. The feet of animals can be become infected due to the animal stepping on a burr. There are many techniques for controlling puncturevine, including spraying with herbicide such as Roundup to kill any growing plants. A plant can also be physically removed (for example, by hoeing off its taproot and then removing the plant along with any developing seeds on the plant) before the plant can deposit too many burrs. Another technique is set forth in U.S. Pat. No. 8,449,683. The patent discloses a roller apparatus for picking up burrs off the ground, where a stretchable fabric is removably mounted over the roller. When the roller is rolled over the ground, burrs on the ground stick into the fabric on the roller. After enough burrs have been picked up and are sticking into the fabric in this fashion, the fabric along with the burrs is removed from the roller and is disposed of. Another way to control puncturevine is to employ a weevil (for example, *Microlarinus lareynii*) that naturally eats the burrs. In California, such weevils are available for purchase from local agricultural government agencies. The larvae of the weevil tunnels into a burr, and eats the burr out from the inside, and thereby destroys the burr. Burrs on the ground can also be killed by torching the ground with heat using a gas torch. It typically takes several years, employing multiple different methods, just to reduce the concentration of puncturevine seeds that lay dormant in the soil where a puncturevine once lived. Removing all burrs in an area is exceedingly difficult. Notwithstanding the various methods set forth above that may be unsuccessful in combating the puncturevine to varying degrees in a particular circumstance, other techniques for combating the puncturevine weed are sought.

SUMMARY

A device usable for picking up puncturevine burrs disposed on an area of ground comprises a cylindrical roller member, a scraper, a catch, a support member, and a handle member. The cylindrical roller member has a rotational axis. The scraper is disposed with respect to the roller so that the scraper scrapes the surface of the roller member when the roller member rotates about its rotational axis. As burrs are picked up off the ground and are carried by the roller member up and over the top of the roller and down to the scraper, the scraper scrapes or otherwise pries off or even breaks the burrs from the roller member. The catch is disposed with respect to the scraper so that the puncturevine burrs that are dislodged from the roller member by the scraper fall into and are retained by the catch as the roller member is rolled over the area of the ground. The support member holds the scraper and catch with respect to the roller member so that when the roller member rotates about its rotational axis the scraper scrapes over the surface of the roller member. The handle member is coupled to the support member allowing a user to push the roller member over the ground.

The roller member is held in place by an axle. In one example, the axle extends in the direction of the axis through a first hole in the support member, through a spacer, through the cylindrical roller member, through a second spacer, and through a second hole in the support member on the opposite side of the roller member. The axle is held in place by nuts. The spacers prevent the roller member from rubbing on the against the support member.

In accordance with one novel aspect, at least an outside surface layer of the roller member is made of a resilient material that is adequately soft and resilient such that the puncturevine burrs on the ground will readily stick into the material as the device is rolled over the area of ground under the weight of the device itself, and such that the burrs will then be lifted off the ground as the roller member rotates about the axis, with the burrs sticking into the outer surface layer of the roller member. The resilient material is, however, adequately hard that the puncturevine burrs do not stick so far into the roller member that they cannot be easily removed from the roller member by the scraper. In one example, the resilient material is a fairly hard and dense rubber layer.

In a method of use, a user pushes the device over the area of the ground. Under the weight of the device itself, puncturevine burrs are picked up by the roller member and are scraped off of the roller member by the scraper, and are retained by the catch. After a time of usage, burrs that collect in the catch are removed and disposed of. In one example, the user simply tilts the device to the side over a receptacle such as a garbage can so that the burrs then slide out of the catch (traveling substantially parallel to the rotational axis of the roller member) and fall into the receptacle.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
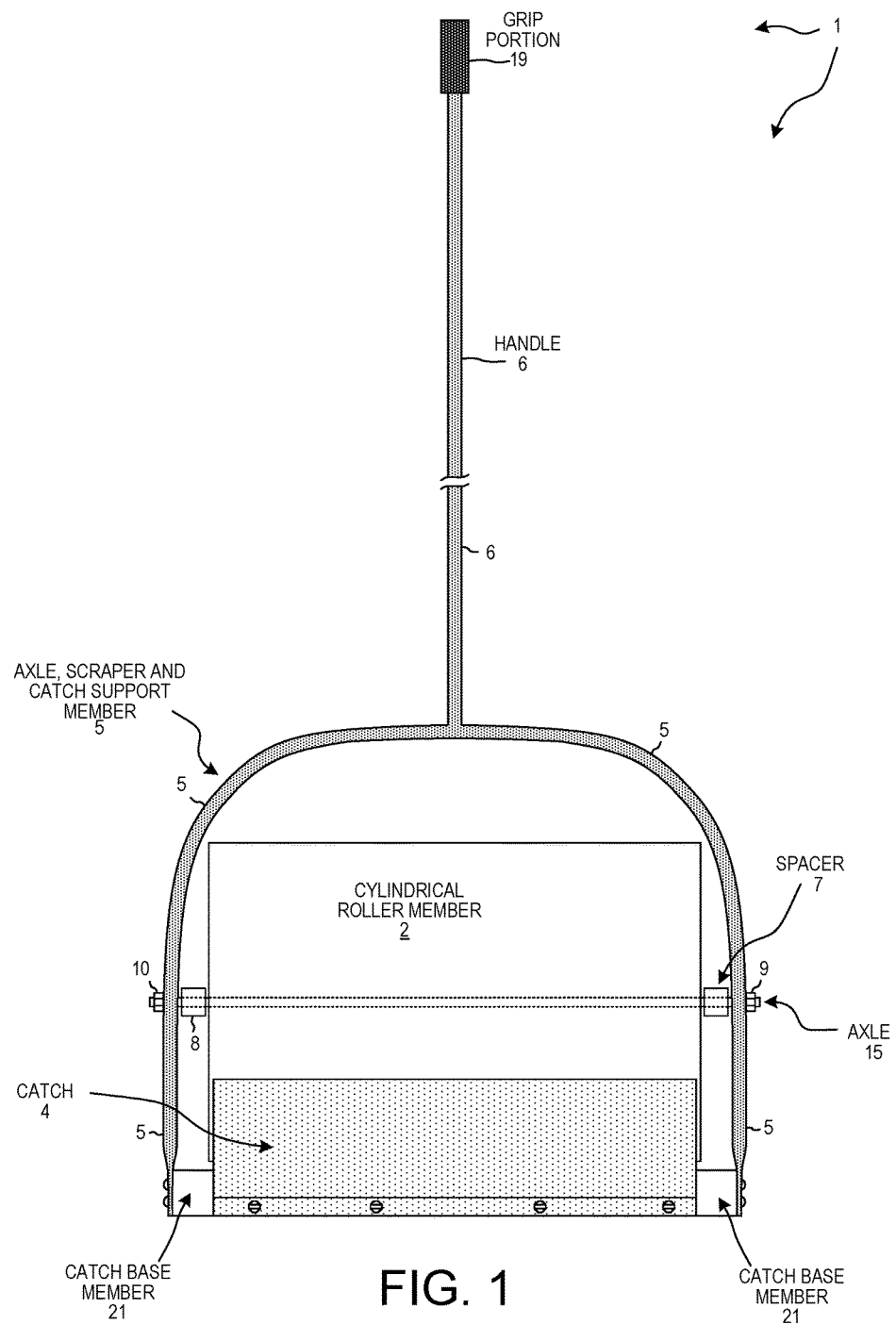
FIG. 1 is a top-down view of a device 1 usable for picking up puncturevine burrs.
Figure 2:
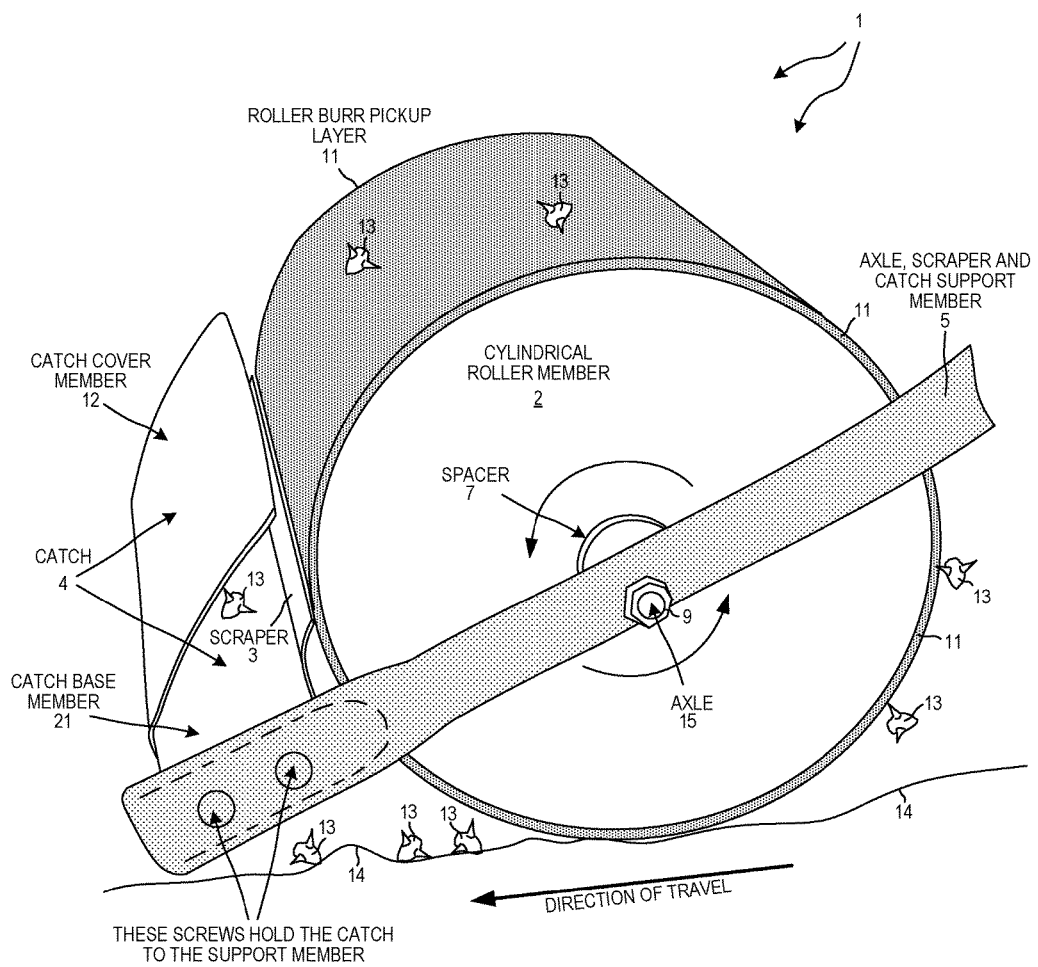
FIG. 2 is a perspective side view of the device 1 of FIG. 1, showing how the cylindrical roller member 2 involves a roller burr pickup layer 11 disposed over an inner cylindrical portion of the roller member.

FIG. 1 is a diagram of a device 1 in accordance with one novel aspect. FIG. 2 is a perspective side view of the device 1. The device 1 is usable for picking up puncturevine burrs 13 (goatheads) that are disposed on an area of ground or soil 14. In the specific embodiment of FIG. 1, the device 1 includes a cylindrical roller member 2, a scraper 3, a catch 4, a support member 5, and a handle 6. The handle, in one example, is an extension of the support member 5 as illustrated in FIG. 1. The cylindrical roller member 2 has a rotational axis. In the example of FIG. 1, an axle 15 extends in the direction of the axis through a first hole in the support member 5, through a first spacer 7, through the cylindrical roller member 2, through a second spacer 8, and through a second hole in the support member 5 on the opposite side of the roller member. The axle 15 is held in place by nuts 9 and 10. The spacers prevent the roller member from rubbing on the against the support member 5. At least an outside surface layer 11 of the roller member 2 is made of a resilient material that is adequately soft and resilient such that the puncturevine burrs on the ground will readily stick into the material as the device 1 is rolled over the area of ground under the weight of the device itself, and such that the burrs will then be lifted off the ground as the roller member 2 rotates about the axis, with the burrs sticking into the outer surface layer 11 of the roller member as illustrated in FIG. 2. The resilient material is, however, adequately hard that the puncturevine burrs do not stick so far into the roller member 2 that they cannot be easily removed from the roller member 2 by the scraper 3. In one example, the resilient material is a fairly hard and dense rubber layer.

The scraper 3 is disposed with respect to the roller member 2 as shown in FIG. 2 so that the scraper scrapes over and/or against the outside surface of the roller member when the roller member rotates about its rotational axis. As burrs are picked up off the ground and are carried by the roller member up and over the top of the roller and down to the scraper, the scraper 3 scrapes or otherwise pries off or even breaks the burrs from the roller member. The catch 4 is disposed with respect to the scraper 3 so that the burrs that are dislodged from the roller member by the scraper then fall into and are retained by the catch 4. In the example of FIG. 2, the catch 4 includes a catch base member portion 21 and a catch cover member portion 12. One end of the catch base member portion 21 is coupled by screws to one side arm of the support member 5, whereas the other end of the catch base member portion 21 is coupled by screws to the opposite side arm of the support member 5. The support member 5 holds the scraper 3 and catch 4 with respect to the roller member 2 so that when the roller member 2 rotates about its rotational axis the scraper 3 scrapes over the outside cylindrical surface of the roller member.

In a method of use, a user pushes the device 1 over the area of the ground 14. The device 1 can also be pulled, or pushed, over the ground by a vehicle. The device 1 can be made larger or smaller, depending on the usage and how the device is to be propelled over the ground. Under the weight of the device itself, puncturevine burrs 13 are picked up by the roller member and are scraped off of the roller member by the scraper, and are retained by the catch. After a time of usage, burrs that collect in the catch are removed and disposed of. In one example, the user simply tilts the device 1 to the side over a receptacle such as a garbage can so that the burrs then slide out of the catch 4 (traveling substantially parallel to the rotational axis of the roller member) and fall into the receptacle.

In one example, the device 1 is supplied to a retail customer in disassembled and compact form in a box or other container, with the handle/support member disassembled. In such an embodiment, the handle/support member is not a unitary member as shown in FIG. 1 but rather is provided in the box in pieces of roughly the length of the roller member, and these pieces can then be assembled by the ultimate user into a larger handle/support member. The user attaches the catch and scraper to the handle/support member, and attaches the roller member to the handle/support member.

In one novel aspect, the device 1 is advertised and/or provided to a retail customer along with packaging or retail literature, where the packaging/literature discloses a use of the device in picking up puncturevine burrs. The disclosure of the use of the device in one example involves a depiction of a use of the device in picking up puncturevine burrs. The disclosure of the use of the device in another example involves a textual description of using the device to pick up puncturevine burrs. The disclosure of the use of the device in picking up puncturevine burrs is, in some examples, provided to the retail customer via internet communication. The device is ordered via the internet, and is then shipped to the customer in disassembled form in a box as described above.

Although certain specific exemplary embodiments are described above in order to illustrate the invention, the invention is not limited to the specific embodiments. A less expensive version of the device to manufacture and to ship involves a roller member that is made entirely or substantially entirely out of foam (a unitary or substantially unitary foam cylinder), and may involve a handle/support member that only sticks into the roller member from one side. One end of an axle may be fixed to the hand/support member, whereas the opposite end of the axle may not be fixed to any other arm of the handle/support member. In this case, the handle/support member does not have two arm portions, but rather only engages the roller member from one side. The scraper may be attached on the opposite side of the roller member from the handle as in the example illustrated in FIG. 1, or alternatively the scraper may be attached on the side of the roller member closer to the handle. The device may be provided to the user in a light weight fashion, such that after shipping the user assembles the device and adds weight to the device so that the added weight assists the device in pushing down onto and engaging burrs. The roller member may, for example, be hollow and fillable by the user with a weighting material such as sand or dirt. In one example the outer burr pickup layer 11 is readily removable and/or replaceable by the user. Rather than the outer layer 11 being permanently glued, stapled or otherwise non-removably fixed to the inside cylindrical portion of the roller member 2, the outer layer 11 is provided in a more readily removable fashion. For example, the outer layer may be removably fixed to the inside cylindrical portion of the roller member 2 by hook and loop fasteners (for example, Velcro), or by another type of disengageable fastening mechanism.

Figure 3:
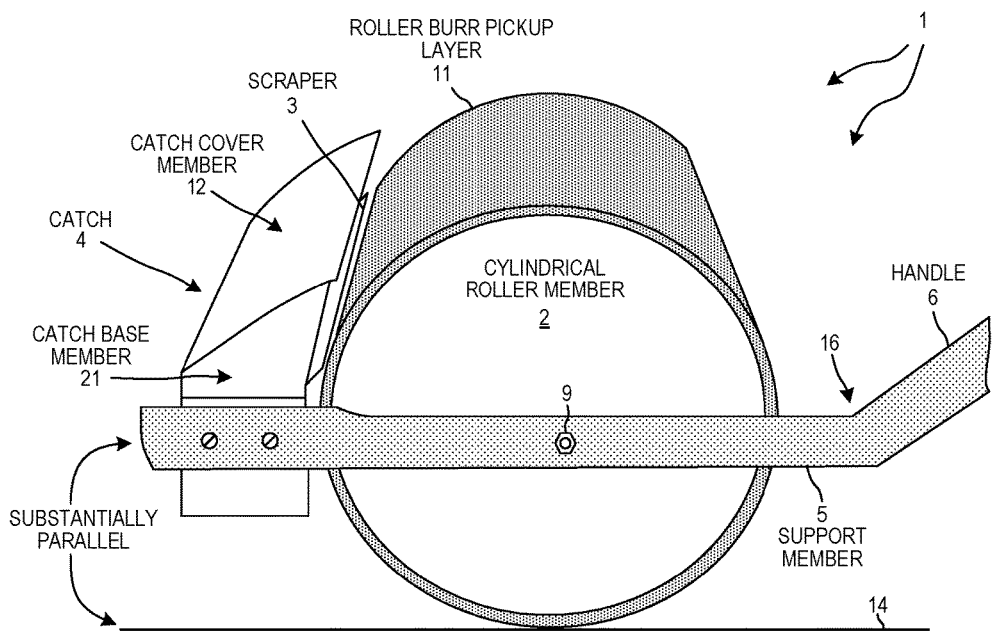
FIG. 3 is another perspective side view of the device 1 of FIG. 1.

FIG. 3 is another perspective side view of the device 1 of FIG. 1. The support member 5 and handle 6 form an angle 16 when viewed from a side perspective as shown in FIG. 3. The angle 16 is an obtuse angle. By joining the support member 5 and handle 6 at the angle 16, the support member 5 remains substantially parallel to the ground 14 during normal operation of the device 1. As a result, joining the support member 5 and handle 6 at the angle 16 provides for improved traction between the pickup layer 11 and the ground 14 thereby increasing the number of burrs removed per pass of the device 1. In one example, the angle 16 is greater than 120 degrees.

Figure 4:
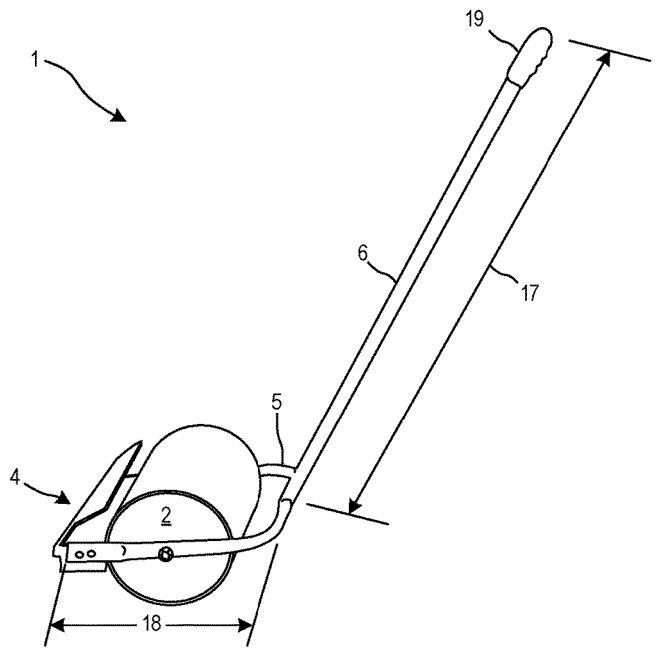
FIG. 4 is a perspective view of the device 1 of FIG. 1.

FIG. 4 is a perspective view of the device 1 of FIG. 1. The handle 6 has a length 17 that is at least three times as long as a length 18 of the support member 5. As a result, a user is able to operate the device 1 more comfortably than if the handle were not as long with respect to the support member 5. If the handle 6 were too short as compared to the support member 5, then the user of the device 1 would need to bend down uncomfortably to use the device 1 effectively. In another example, the handle 6 has a length 17 that is at least four times as long as a length 18 of the support member 5.

In accordance with another novel aspect, an end of handle 6 includes a grip portion 19 allowing for ease of use and improving the turning radius of device 1 during operation. In one example, the grip portion 19 of handle 6 is made of rubber. In another example, the grip portion 19 of handle 6 is made of foam. In yet another example, the grip portion 19 of handle 6 is made of plastic.

Figure 5:
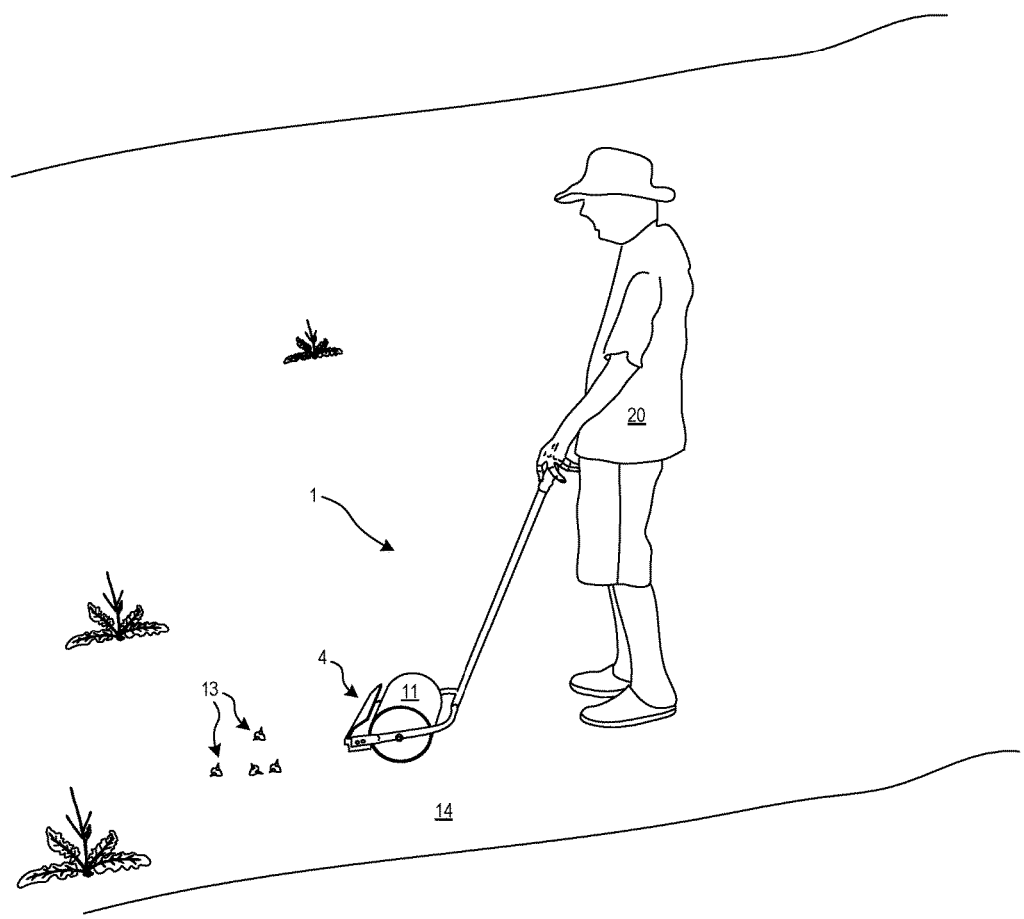
FIG. 5 is a diagram illustrating how a user 20 utilizes the device 1 to pick up puncturevine burrs.
Figure 6:
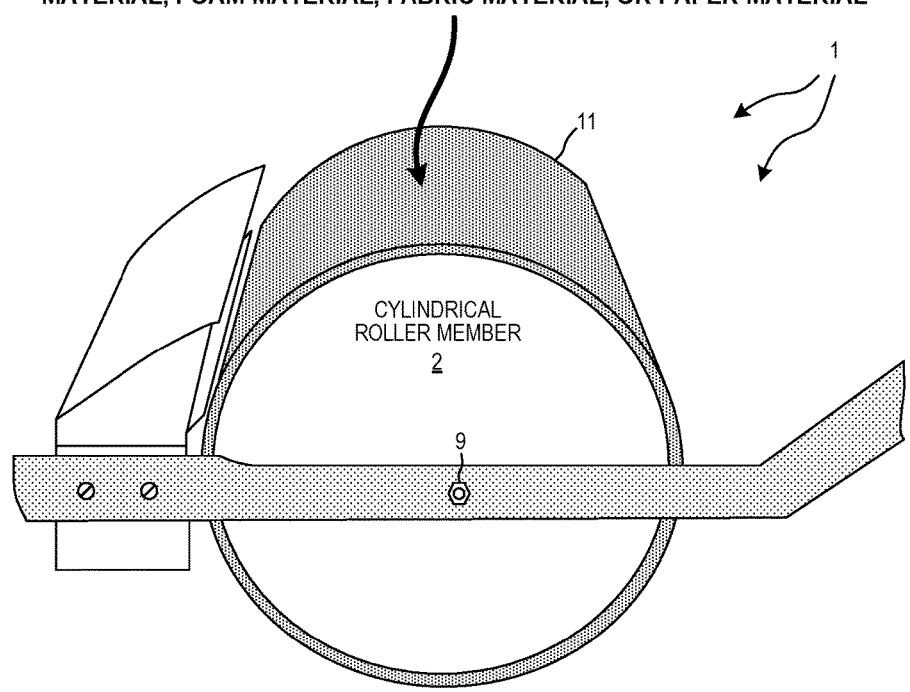
FIG. 6 is a diagram show how the outside surface layer of roller member 11 is made of a resilient material, such as rubber material, foam material, fabric material, or paper material.
Figure 7:
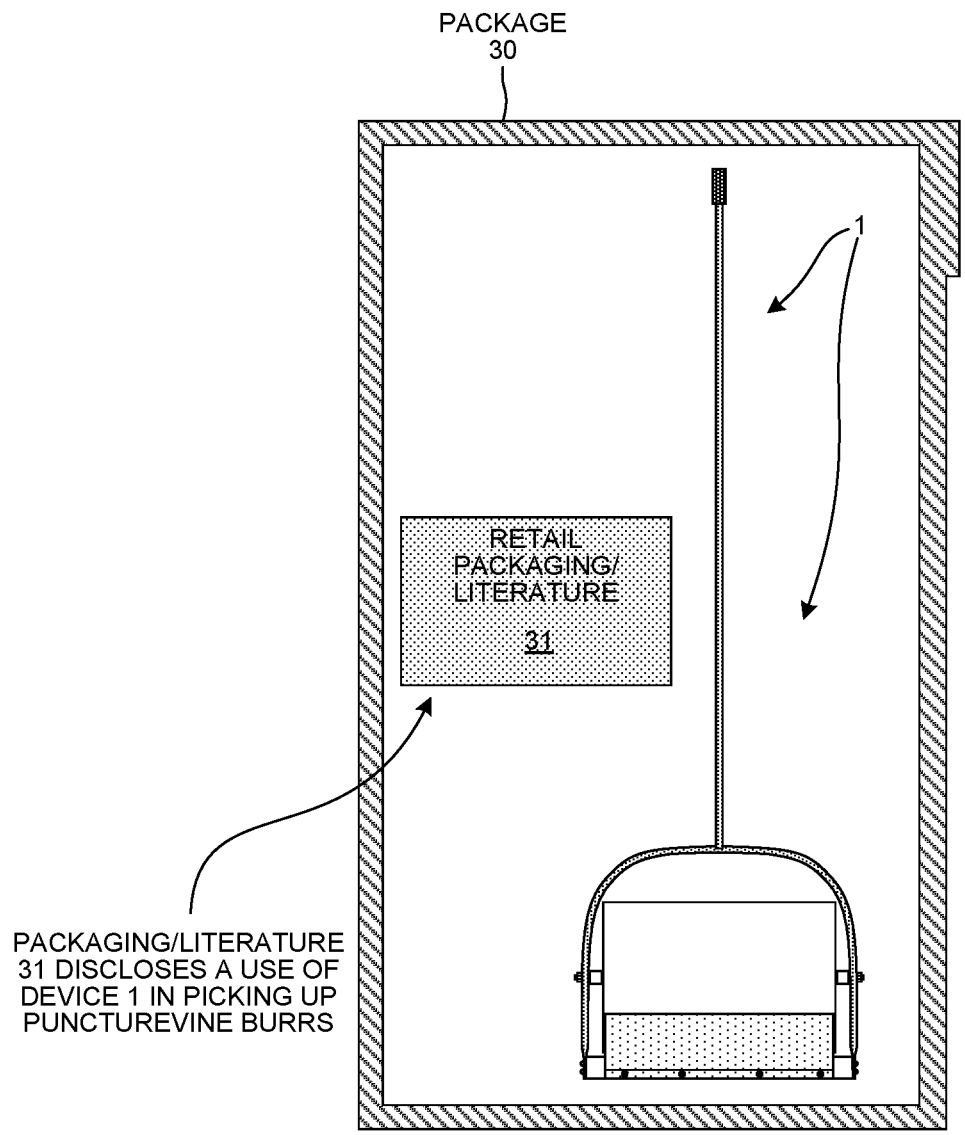
FIG. 7 is a diagram showing a package 30 comprising the device 1 and retail packaging/literature 31 that includes a textual description of using the device to pick up puncturevine burrs.

FIG. 5 is a diagram illustrating how the device 1 is used to pick up puncturevine burrs. A user 20 pushes the device 1 over the area of the ground 14. Under the weight of the device 1 itself, puncturevine burrs 13 are picked up by the burr pickup layer 11 and are scraped off of the roller member by the scraper, and are retained by the catch 4. After a time of usage, burrs that collect in the catch 4 are removed and disposed of. In one example, the user 20 simply tilts the device 1 to the side over a receptacle such as a garbage can so that the burrs 13 then slide out of the catch 4 (traveling substantially parallel to the rotational axis of the roller member) and fall into the receptacle. In another example, the device 1 can also be pulled, or pushed, over the ground 14 by an autonomous robot that traverses the ground 14 to automatically pick up puncturevine burrs 13.

Accordingly, various modifications, adaptations, and combinations of various features of the described embodiments can be practiced without departing from the scope of the invention as set forth in the claims.

What is claimed is:

1. A device for picking up puncturevine burrs disposed on an area of ground, comprising:
    a cylindrical roller member, wherein the cylindrical roller member has a rotational axis, wherein at least a cylindrical outside surface layer of the roller member is a substantially hard and dense rubber layer, and wherein the rubber layer is adequately soft and resilient such that puncturevine burrs will stick into the rubber layer and be lifted off the ground if the roller member is rolled over the burrs when the burrs are disposed on the area of the ground;
    a scraper disposed with respect to the roller so that the scraper scrapes the surface of the roller member when the roller member rotates about its rotational axis, and wherein the rubber layer is adequately hard such that the puncturevine burrs do not stick so far into the roller member that the burrs cannot be removed from the roller member by the scraper;
    a catch disposed with respect to the scraper so that puncturevine burrs that are dislodged from the roller member by the scraper fall into and are retained by the catch as the roller member is rolled over the area of the ground;
    a support member that holds the scraper and catch with respect to the roller member so that when the roller member rotates about its rotational axis the scraper scrapes over the surface of the roller member; and
    a handle member that is coupled to the support member, wherein the scraper is attached on the opposite side of the roller member from the handle member.

2. The device of claim 1, wherein the cylindrical roller member includes a first portion and a second portion, wherein the first portion is a cylindrical member made of a material, wherein the second portion is the rubber layer, and wherein the material of the first portion is of a different material than the rubber layer.

3. The device of claim 1, wherein the cylindrical roller member is a unitary cylindrical member made substantially entirely of hard and dense rubber.

4. A method comprising:
    moving a device to pick up and catch puncturevine burrs, wherein the device includes a cylindrical roller member and a scraper and a catch, wherein the moving of the device causes the cylindrical roller member to roll over the puncturevine burrs and to rotate about an axis of the cylindrical roller member such that the scraper scrapes a surface of the roller member and dislodges burrs from the cylindrical roller thereby causing the burrs to fall into the catch and to be retained by the catch without the burrs passing beyond the scaper without being dislodged, wherein the cylindrical roller member is disposed between the scraper and a handle adapted to move the device, and wherein the cylindrical roller member includes a rubber layer made of a substantially hard and dense rubber material such that the puncturevine burrs do not stick so far into the roller member that the burrs cannot be removed from the roller member by the scraper.

5. The method of claim 4, wherein the cylindrical roller member includes a first portion and a second portion, wherein the first portion is a cylindrical member made of a material, wherein the second portion is the rubber layer, and wherein the material of the first portion is of a different material than the rubber layer.

6. The method of claim 4, wherein the rubber layer is adequately soft and resilient such that puncturevine burrs will stick into the rubber layer and be lifted off the ground if the cylindrical roller member is rolled over the burrs when the burrs are disposed on the area of the ground.

* * * * *